INVENTOR
WALTON C. MARSH
BY Kingsland, Rogers & Ezell
ATTORNEYS.

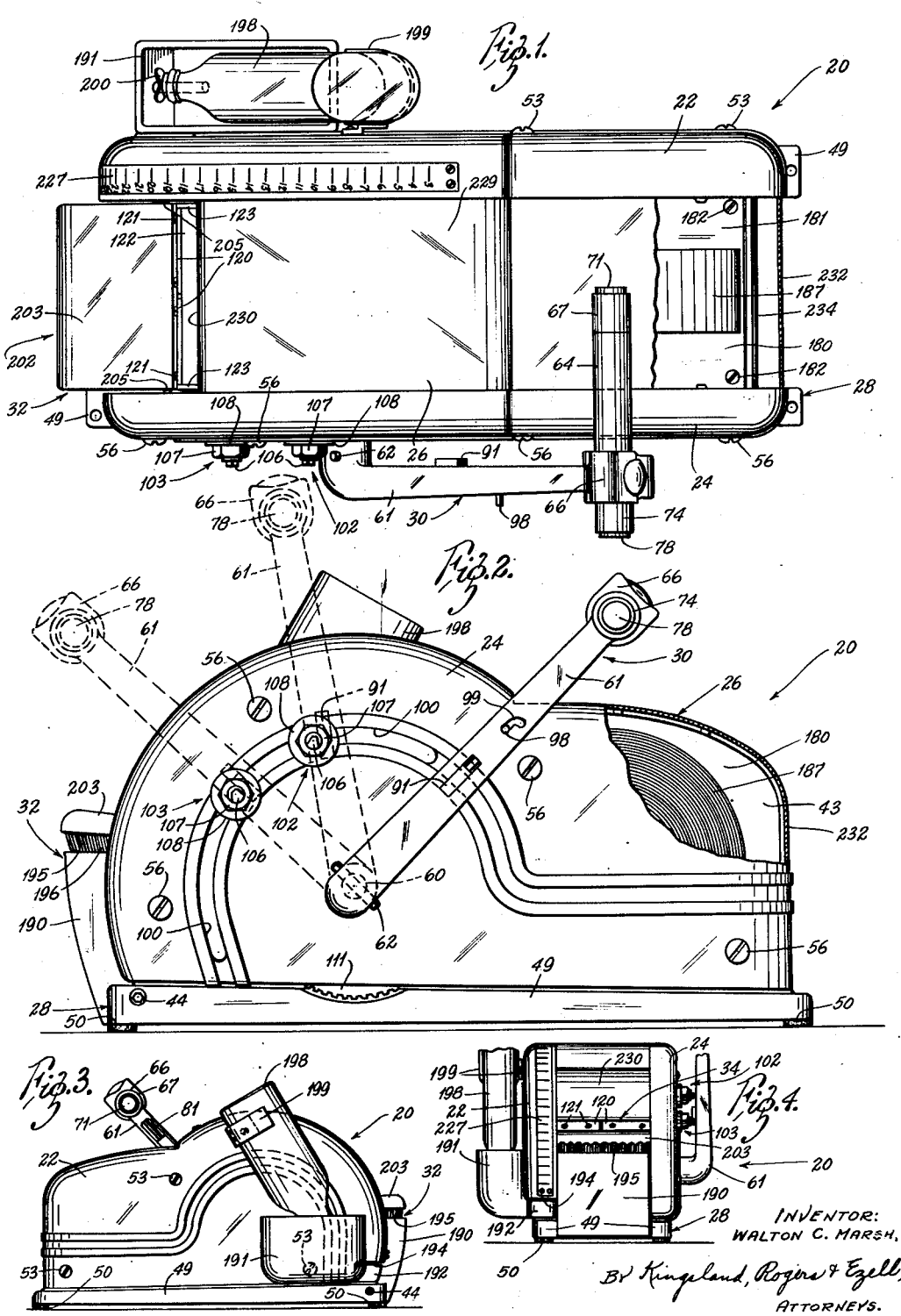

June 17, 1952 W. C. MARSH 2,601,159
DISPENSING MACHINE
Filed April 15, 1946 4 Sheets-Sheet 3
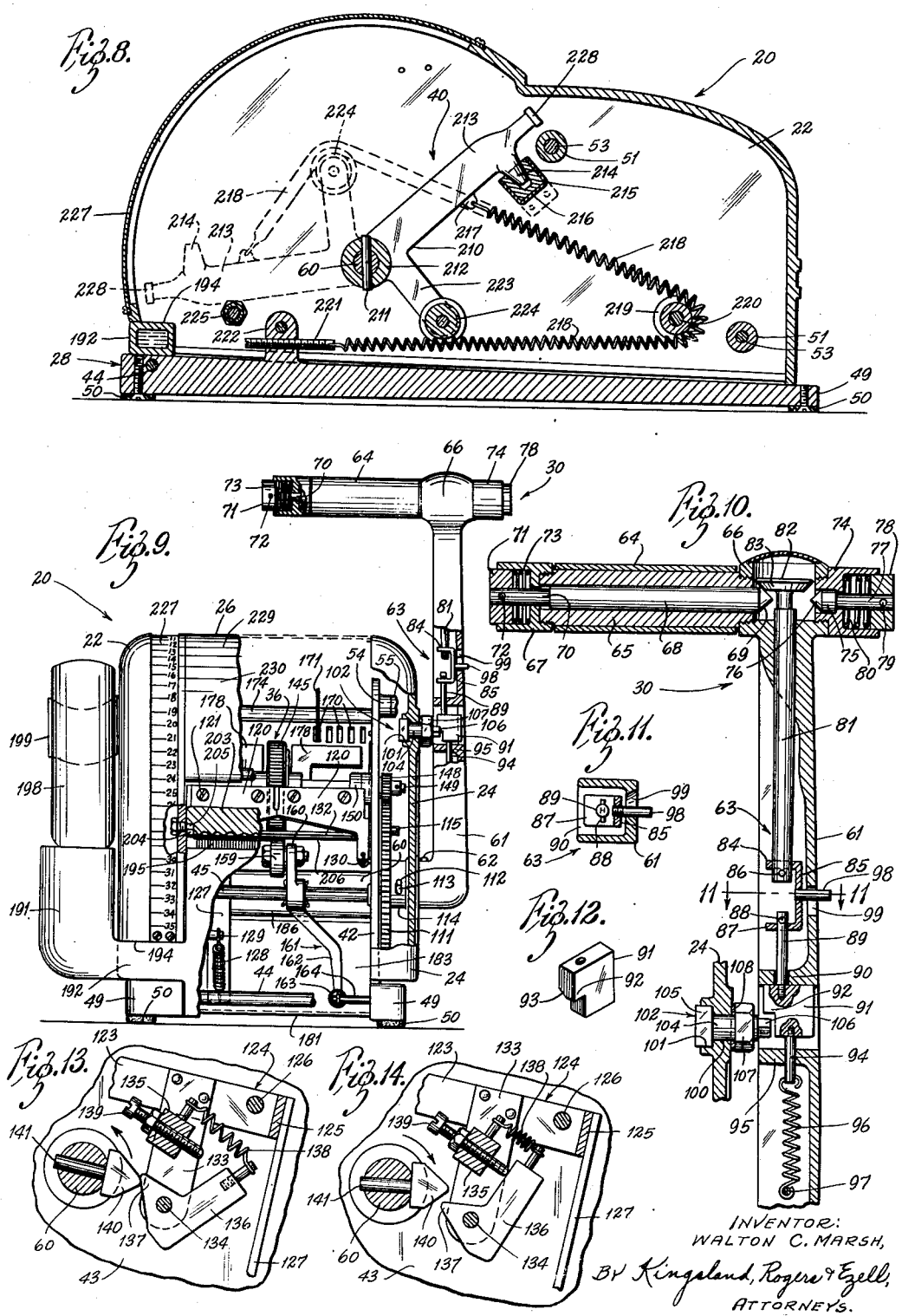
INVENTOR:
WALTON C. MARSH,
BY Kingsland, Rogers & Ezell,
ATTORNEYS.

June 17, 1952  W. C. MARSH  2,601,159
DISPENSING MACHINE
Filed April 15, 1946  4 Sheets-Sheet 4

INVENTOR:
WALTON C. MARSH,
By Kingsland, Rogers & Ezell,
ATTORNEYS.

Patented June 17, 1952

2,601,159

UNITED STATES PATENT OFFICE 2,601,159

DISPENSING MACHINE

Walton C. Marsh, Belleville, Ill., assignor to Marsh Stencil Machine Company, Belleville, Ill., a corporation of Illinois Application April 15, 1946, Serial No. 662,338

9 Claims. (Cl. 271—2.4)

The present invention relates generally to dispensing machines, and more particularly to gummed tape moistening and dispensing machines adapted to deliver moistened selected tape lengths for application to packages, cartons and the like.

An object of the present invention is to provide a novel gummed tape dispensing machine which is adapted to deliver moistened tape segments of selected lengths.

Another object is to provide a novel tape dispensing machine which is adapted to deliver tape segments of selected lengths at rapid rates without overrun or retraction of the tape strip.

Another object is to provide a novel tape dispensing machine which is adapted to deliver tape segments of any selected length between predetermined minimum and maximum lengths.

Another object is to provide a novel tape dispensing machine which is adapted to accommodate tape rolls of any width between preselected minimum and maximum widths and which incorporates structural dispensing features adapted to smoothly receive the tape strip from the roll and to pass it to a point of ultimate use.

Another object is to provide a novel tape dispensing machine incorporating operating mechanism by which stops normally used in the cutting of tape segments of preselected lengths can be rendered inoperative at will during a dispensing cycle.

Other objects are to provide a novel tape dispensing machine which is adapted to rapidly and accurately dispense tape segments, which is of sturdy and rugged construction and adapted thereby to render long service under severe usage, which is simple in construction and readily fabricated, and which may be readily operated in an efficient manner by a user with a minimum of instruction.

Other objects and advantages, in addition to the foregoing, are apparent from the following description taken with the accompanying drawings, in which:

Fig. 1 is a top plan view of a gummed tape dispensing machine constructed in accordance with the teachings of the present invention, a portion being broken away to show the tape roll in its chamber;

Fig. 2 is a side elevational view thereof, the operating handle being shown in several positions and a part of the casing being broken away to show the tape roll in the tape chamber;

Fig. 3 is a side elevational view thereof on a reduced scale of the other side;

Fig. 4 is a front elevational view thereof on a reduced scale, parts of the water bottle and the handle being broken away for conservation of space;

Fig. 8 is a vertical sectional view on the line 8—8 of Fig. 5;

Fig. 9 is a front elevational view thereof, parts being in cross section and parts being broken away for clarity of illustration, the handle being in the central position of Fig. 2;

Fig. 10 is an enlarged longitudinal sectional view through the operating arm assembly of the machine;

Fig. 11 is a sectional view on the line 11—11 of Fig. 10;

Fig. 12 is an isometric view of the reciprocable latch rider of the machine;

Fig. 13 is an enlarged elevational detail view of a portion of the cutting knife operating mechanism showing the relation of the elements after initial movement of the operating arm and prior to tape dispensing;

Fig. 14 is an enlarged elevational detail view similar to Fig. 15 but showing the parts in their relation just prior to depression of the cutting knife to sever the dispensed tape;

Figures 5, 6, 7, 15, 16:
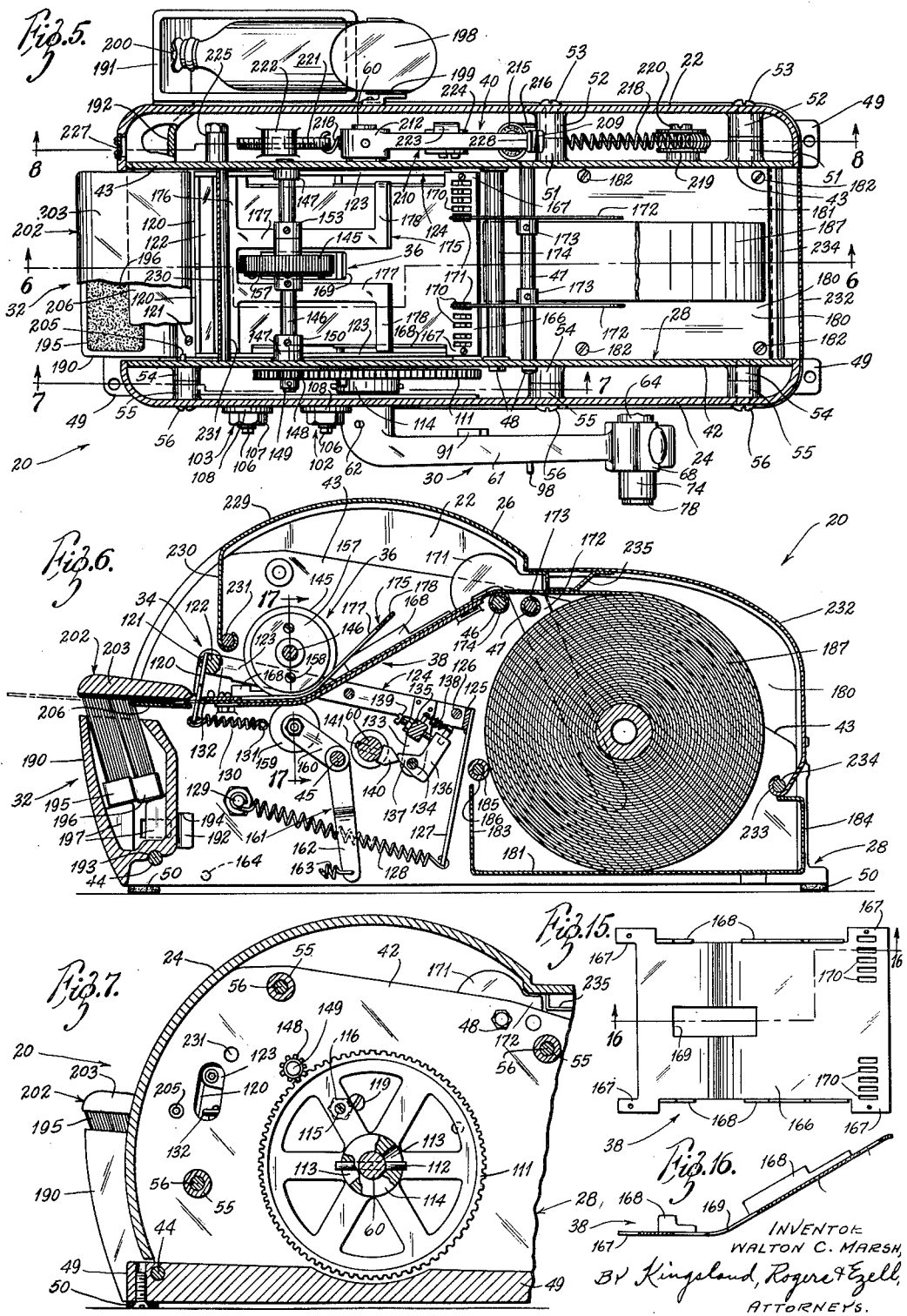
Fig. 5 is a view thereof partly in plan and partly in cross section.
Fig. 6 is a vertical sectional view on the line 6—6 of Fig. 5, the moistening brushes and the tape roll being shown in elevation.
Fig. 7 is a vertical sectional view on the line 7—7 of Fig. 5.
Fig. 15 is a plan view of the tape chute.
Fig. 16 is a section on the line 16—16 of Fig. 15.

Referring more particularly to the drawings by reference numerals, 20 indicates generally a gummed tape dispensing machine embodying the principles of the present invention. Broadly, the tape dispensing machine 20 includes side panels 22 and 24, a cover 26, a supporting frame 28, an operating arm assembly 30 with associated elements, a tape moistening assembly 32, a cutting knife assembly 34, a tape feeding assembly 36, a tape guide construction 38, a buffer and return mechanism 40, and relating and connecting elements.

More specifically, the supporting frame 24 serves to mount the several working parts and assemblies of the present invention, and includes vertical side walls 42 and 43 of the configuration clearly shown in the drawings. The side walls 42 and 43 are maintained in spaced rigid relation by a plurality of transversely disposed shafts such as shafts 44, 45, 46 and 47 anchored in the walls by suitable nuts 48 or the like (Figs. 5 and 6). Each side wall 42 and 43 is enlarged along the lower edge to provide an outwardly extending thickened flange 49, each of which has attached thereto underneath the ends thereof supporting bosses 50 of rubber or the like.

The side panel 22 is attached to and spaced from the vertical wall 43 by a plurality of bosses 51 formed integral with the wall 43 and bosses 52 formed integral with the panel 22 which threadedly receive suitable screws 53. Similarly, the side panel 24 is attached to and spaced from the side wall 42 by bosses 54 formed integral with the wall 42 and bosses 55 formed integral with the panel 24 and suitable screws 56.

The operating arm assembly 30 includes a shaft 60 having bearing support in bosses formed integral with the walls 42 and 43, to one outer end of which is keyed a handle arm 61 by means of a pin 62. As is best seen in Figs. 2 and 9 through 12, the handle arm 61 is of channel cross section and houses the vertically reciprocating elements of a latching mechanism generally designated 63. At its free end, the handle arm 61 supports a handle grasp 64 of cylindrical configuration. The grasp 64 comprises a tubular member 65 which, at one end, threadedly engages for support a housing 66 formed at the free end of the handle, and, at the other end, threadedly receives a cup-shaped member 67. Within the tubular member 65 is a reciprocable plunger 68 having a conical end 69 extending into the housing 66 and a reduced portion 70 extending through the bottom of and into the cup-shaped member 67. A push button 71 is keyed to the end of the reduced portion 70 by a suitable pin 72. The push button 71 is of a configuration to nestle within the cup-shaped member 67 for reciprocative movement and is biased outwardly by a compression spring 73. A cup-shaped member 74 threadedly engages the housing 66 for support thereby in opposed relation to the tubular member 65. The cup-shaped member 74 carries a reciprocative plunger 75 of reduced length which has a conical end 76 adapted to be moved into the housing 66 and a reduced portion 77 extending through the bottom of and into the cup 74. A push button 78 is keyed to the reduced portion 77 by a suitable pin 79 and is biased outwardly by a compression spring 80.

A longitudinally reciprocable member 81 is disposed in the upper portion of the channeled handle arm 61 and includes a head 82 disposed in the housing 66 having a beveled annular surface 83 adapted to be contacted by the conical ends 69 and 76 of the plungers 68 and 75, respectively. At its lower end, the member 81 extends through an aperture in an upper flange 84 of a connecting member 85, a suitable transversely extending pin 86 preventing removal of the connecting member 85. Similarly connected to a lower flange 87 of the connecting member 85 by a suitable pin 88 is a stub shaft 89 which extends through a partition 90 formed integral with the handle arm 61 and threadedly engages a latch rider 91, preferably of the configuration clearly shown in Fig. 12. The rider 91 includes a shoulder 92 having a beveled surface 93. An anchor post 94 threadedly engages the lower edge of the rider 91 and extends through a second partition 95 formed integral with the handle arm 61. A tension spring 96 is connected at one end to the lower end of the anchor post 94 and at the other end to a pin 97 mounted transversely of and supported by the walls of the handle arm 61.

It is manifest from the foregoing that the compression springs 73 and 80, through the push buttons 71 and 78, respectively, maintain the plungers 68 and 75 retracted in respect to the head 82 which, by gravity and tension spring 96, normally is in a position so that the rider 91 rests against the lower partition 95. Inward pressure on either of the push buttons effects vertical movement of the head 82 and rider 91 to the positions shown in Fig. 10. In addition to the foregoing means, there is also provided, for raising the rider 91 to the position shown in Fig. 10 and for retaining it so raised, a pin 98 which threadedly engages the web portion of the connecting member 85 and which is movable in an inverted L-shaped slot 99 (Fig. 2) formed in the handle arm 61. The connecting member 85 is sufficiently smaller than the channel of the handle arm 61 to permit it to be rotated by manipulation of the pin 98. It is clear that the rider 91 may be raised against the tension of the extension spring 96 by manually raising the pin 98, and will be maintained there by the spring 96 after the pin 98 is rotated into the foot of the L-shaped slot 99.

An arcuate slot 100 of the extent shown in Fig. 2 is formed in the panel 24 concentric with the shaft 60. An arcuate channel 101 (Fig. 9) is formed on the inner surface of the panel 24 and is of the same radius as that of the arcuate slot 100 (Figs. 9 and 10). Located within the slot 100 are two stops 102 and 103, each of which includes a bolt 104 disposed in the slot 100, a head 105 disposed in the channel 101, a reduced extremity 106 extending to a position to be engaged by the shoulder 92 of the rider 91 when the rider 91 is disposed against the lower partition 95, a securing nut 107, and a suitable lock washer 108. Manifestly, the stops 102 and 103 may be adjusted to any desired position in the arcuate slot 100. More than two stops may be employed if desired.

A large gear 111 is keyed to the shaft 60 adjacent the outer face of the wall 42 and inwardly of the panel 24 by a pin 112 (Fig. 7). To provide a suitable predetermined amount of rotative play between the shaft 60 and the large gear 111, the pin 112 is disposed in opposed fan-shaped openings 113 in the hub 114 thereof. Hence, the large gear 111 does not begin to rotate until the shaft 60 has rotated the pin 112 through the fan-shaped openings 113. A stop pin 115 extends through the gear 111 to support a nut 116, or the like, which engages a screwhead 119 mounted in the wall 42 to limit the return rotation of the gear 111 to insure the relationship between the shaft 60 and the gear 111 as shown in Fig. 7 at the initiation of the dispensing cycle.

The cutting knife assembly 34 is pivotally mounted in the supporting frame 29 for spring actuation to raised or inoperative position and for power actuation downwardly through the cutting stroke by the return stroke of the operating arm assembly 30. The knife assembly 34 includes two blade elements 120 of the configuration and disposed as shown in Fig. 9 which are secured by suitable screws 121 to a transverse member 122 (Figs. 5 and 6) which is pivotally mounted on and between the ends of the legs 123 of a U-shaped member 124 pivotally mounted adjacent the bight 125 thereof on a transversely disposed shaft 126 anchored in the walls 42 and 43. A depending member 127 is secured to the bight 125 and has a tension spring 128 anchored to a stud 129 mounted on the wall 43 connected to the free end, thereby biasing the knife elements 120 into raised position. A tension spring 130 anchored to a stud 131 mounted in the wall 43 is secured to the lower extremity of each knife element 120 to bias the knife elements 120 into constant engagement with a fixed tape cutting blade 132 mounted on suitable brackets secured to the walls 42 and 43. Depending from each leg 123 near the bight 125 is a strap member 133 which supports a shaft 134 adjacent the lower extremities thereof. The strap members 133 also support a shaft 135 of square cross section in a position above the shaft 134. The shaft 135 is secured against movement relative to the strap members 133. A rocking member 136 having a toe 137 is pivotally mounted on the shaft 134 and is biased by means of a spring 138 secured to the shaft 135 and to the rocking member 136 into engagement with an adjustable screw 139 threaded through the shaft 135, as is clear from Figs. 6, 13 and 14. A rocker member 140 is secured to the shaft 60 by means of a reduced extension 141 which extends through the shaft 60 and is maintained in position by a suitable setscrew (not shown), or the like.

The relationship of the rocker member 140 to the toe 137 of the rocking member 136 is such that, on the forward stroke of the handle arm 61, the rocker member 140 will just clear the toe 137 during the free movement of the handle arm 61, that is, during the time the pin 112 moves in the fan-shaped openings 113. In the clearing action, the rocking member 136 is pivoted clockwise against the tension of the spring 138 and then is brought back into the position shown in Figs. 6 and 14 by the spring 138 as soon as the rocker member 140 has cleared the toe 137. No further action takes place in respect to the cutting knife assembly 34 until the shaft 60 through the handle arm 61 has completed its counterclockwise rotation and in subsequent clockwise rotation has returned the rocker member 140 into engagement with the toe 137. Further movement of the rocker member 140 against the rocking member 136 pivots the U-shaped member 124 counterclockwise which moves the cutting elements 120 downwardly to sever the dispensed tape, the spring 138 returning the cutting elements 120 to the raised position immediately after the rocker member 140 has cleared the toe 137.

Figure 17:
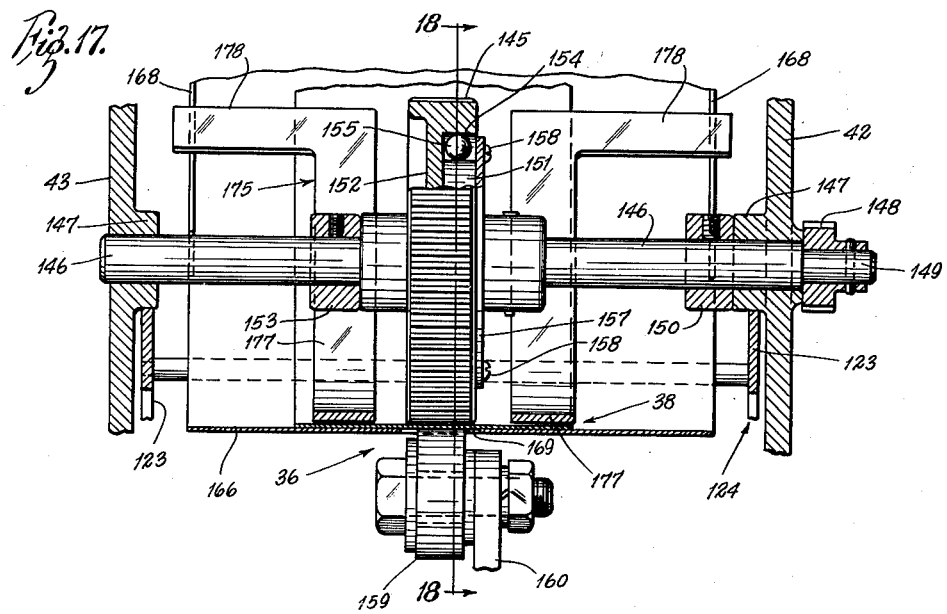
Fig. 17 is an enlarged cross-sectional view on the line 17—17 of Fig. 6, a portion of the feed wheel being shown in elevation.
Figure 18:
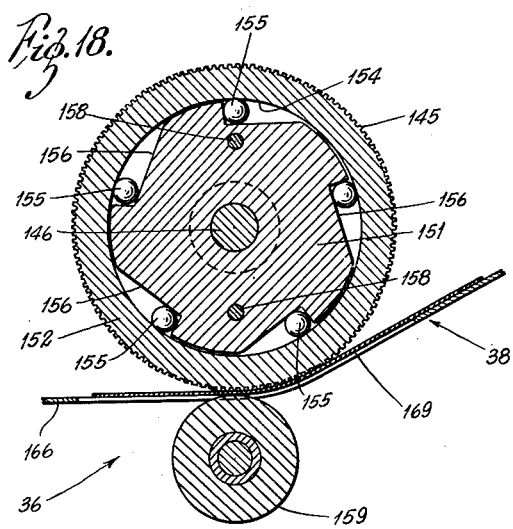
Fig. 18 is a section on the line 18—18 of Fig. 17.
Figure 19:
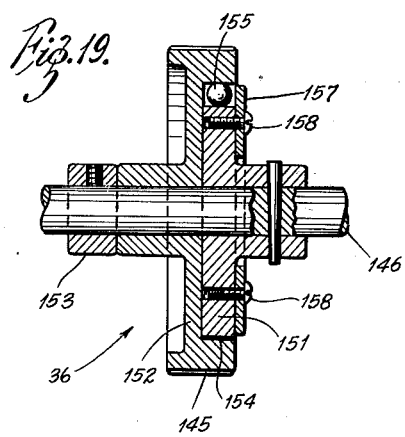
Fig. 19 is an enlarged transverse sectional view through the feed wheel.

The tape feeding assembly 36, best shown in Figs. 5, 6 and 17 through 19, includes a driven wheel 145 having a suitably knurled periphery mounted on and keyed to a shaft 146 journaled in suitable bosses 147 formed integral with the walls 42 and 43 (Fig. 17). The shaft 146 has a pinion 148 keyed to a reduced portion 149 by a suitable pin. The pinion 148 meshes with and is driven by the large gear 111 (Fig. 7). Adjacent the boss 147 formed in the wall 42 is a collar 150 which is secured to the shaft 146 by a suitable setscrew to maintain the shaft 146 against longitudinal movement, cooperating with the pinion 148. The driven wheel 145 is in the form of an overrunning clutch and includes an inner member 151 keyed to the shaft 146 and an outer member 152 which is freely mounted on the shaft 146 and maintained in contiguous position relative to the member 151 by a collar 153 secured to the shaft 146 by a suitable setscrew (Fig. 19). The member 152 is cup shaped on one side to receive the member 151 and to provide a race 154 for ball bearings 155 located in pockets 156 (Fig. 18) formed in the periphery of the member 151. A plate 157, secured to the member 151 by suitable screws 158, maintains the ball bearings 115 in the pockets 156. Disposed beneath and in feeding contact with the periphery of the driven wheel 145 is a small roller 159 (Fig. 6) which is rotatably mounted on one arm 160 of a bell crank 161 pivotally supported on the shaft 45, the other arm 162 of the bell crank 161 having a tension spring 163 secured thereto, the spring 163 being anchored to a pin 164 mounted in the wall 42 (Fig. 9). Hence, the roller 159 is biased towards constant engagement with the driven wheel 145. It is clear from the foregoing that on the forward movement of the arm 61 (after the lost motion is absorbed) the wheel 145 is rotated clockwise to dispense tape and that on the return trip of the handle arm 61 the clutch elements of the wheel 145 take effect to permit counterclockwise rotation of the shaft 146 but to prevent counterclockwise movement of the outer member 152 of the driven wheel 145, thereby preventing withdrawal of the tape on such return trip.

The tape guide construction 38 includes a tape chute 166 of the configuration shown particularly in Figs 15 and 16. The chute 166 includes ears 167, one at each corner, which are secured to suitable brackets mounted on the walls 42 and 43 for disposing the chute 166 in respect to the other working parts, as is clearly shown in Figs. 5 and 6. The chute 166 also includes lateral guide flanges 168, an opening 169 through which the roller 159 extends, and two sets of slots 170 which selectively receive hook ends 171 of a pair of tape roll guide members 172 pivotally mounted on the transverse shaft 47 and secured thereto by an integral collar 173 and a set screw. The upper end of the chute 166 is disposed adjacent the transverse shaft 46 about which is a loosely mounted sleeve 174 which assists in the smooth passage of tape being dispensed. The forward edge of the chute 166 extends to adjacent the rear edge of the fixed blade 132. A guide member 175 (Figs. 5 and 6) cooperates with the chute 166 and the stationary blade 132 and includes a transversely disposed portion 176 disposed above the blade 132 and spaced therefrom by the thickness of the ears 167 of the chute 166, the same securing bolt, or the like, extending through the transverse portion 176, the ears 167 and the blade 132. The guide member 175 also includes rearwardly extending fingers 177 of resilient material which are located one to each side of the driven wheel 145, and which terminate in transversely disposed portions 178 which are spaced from the chute 166, as is clear from Fig. 6.

The tape-roll guide members 172 extend into a tape roll chamber 180, the walls of which are formed by the rear portions of the walls 42 and 43, the bottom of which comprises a plate 181 secured to suitable brackets mounted on the walls 42 and 43 by screws 182. The plate 181 includes a front flange 183 and a rear flange 184. Above the flange 183 is a shaft 185 about which there is loosely mounted a sleeve 186 against which a tape roll 187 rotates during a dispensing operation. The tape roll 187 is loosely disposed in the tape-roll chamber 180 between the tape-roll guides 172, no transverse mounting shaft being necessary.

At the forward end of the tape dispensing machine 20 is the tape moistening assembly 32 which includes a water cup 190 and a water reservoir 191 connected by a closed water channel 192, all of which may be formed as an integral casting (Figs. 1 through 6). The water cup 190 has a transverse groove 193 in the bottom which fits over the transverse shaft 44, the connecting channel 192 fitting into a niche 194 provided in the front of the wall 43. The tape moistening assembly 32 readily slips into position for support by the transverse shaft 44 and the niche 194. In the water cup 190 are two brushes 195 and 196 which are disposed at a forwardly directed angle by suitable ribs 197. The brushes 195 and 196 include bristles which feed water to the free ends thereof by capillary action for moistening tape, as is well known in the art. A bottle 198, supported in a bracket 199 secured to the panel 22, is inverted in the reservoir 191 and is provided with any type of metering valve 200 to feed water into the reservoir 191 as it is used. The metering valve 200 is, of course, adapted to be closed off when the machine 20 is not in use.

A presser and tape terminus guide member 202 is pivotally mounted above the brushes 195 and 196 and rests on the bristle ends thereof. The member 202 includes a heavy body plate 203 having grooves in the underside in the direction of tape movement and in each side of which, toward the rear thereof, is a slot 204 adapted to engage projecting reduced extensions 205 (Figs. 5 and 9) of suitable screws mounted on the walls 42 and 43. A thin plate 206 is secured to and is spaced from the bottom of the body plate 203 to form a guide passage to direct tape forwardly between the bristle ends of the brushes 195 and 196 and the forward underside of the body 203. The rear edge of the body plate 203 is beveled, as is clearly shown in Fig. 9, to provide a widened mouth to the guide formed by the plate 206 and the bottom of the body plate 203. It is clear from Fig. 6 that the mouth so formed is disposed adjacent the reciprocable blade elements 120 to receive tape from between the fixed blade 132 and the guide member 175.

The buffer and return mechanism 40 is best shown in Figs. 5 and 8, and includes a bell crank 210 keyed to the other end of the shaft 60 by means of a suitable pin 211 extending through the shaft 60 and a hub portion 212 of the bell crank 210. One arm 213 of the bell crank 210 has a conical projection 214 near the free end, which, in the rest position of the dispensing machine 20, snugly nestles in a lining 215 of hard rubber, or the like, disposed in a cup 216 mounted on the outer face of the wall 43. Intermediate the ends of the arm 213 is an apertured lug 217 to which is connected one end of a heavy helical tension spring 218. The spring 218 is led around a pulley 219 which is supported for rotation on the wall 43 by means of a screw 220 threadedly engaging a boss formed integral with the wall 43. The other end of the spring 218 is connected to an anchor screw 221, which threadedly engages an apertured lug 222 formed integral with the wall 43. The anchor screw 221 may be rotated for adjustment of the tension of the spring 218. The bell crank 210 includes a second arm 223 on the free end of which is rotatably mounted a pulley 224. In the path of the arm 213 is a stop sleeve 225 mounted on the wall 43 and adapted to limit the forward movement of the arm 213.

In Fig. 8, the buffer and return mechanism 40 is shown in dotted lines in the extreme forward position. It is to be observed that the pulley 224 on the extremity of the arm 223 engages the spring 218 as the bell crank is rotated counterclockwise to maintain the tensioning effect thereof.

The panel 22 includes a scale 227 marked off in inches showing numerals from 3 to 36 (Figs. 1 and 9). The scale 227 is of transparent material and seats in an arcuate slot formed in the flange of the panel 22. The scale 227 is disposed over the path of the bell crank 210, a head 228 being formed on the free end of the arm 213 and provided with a transverse mark 209 to serve as a pointer to indicate the tape length being dispensed (Figs. 5 and 8).

The cover 26 includes a front plate element 229 having a forward flange 230 terminating in a curled end which fits around a shaft 231 supported by the walls 42 and 43 (Fig. 6). The cover 26 also includes a rear plate 232 having a curled portion 233 fitting around a transverse shaft 234 supported by the walls 42 and 43. A bracket 235 is secured to and depends from the underside of the plate 232 and is of a configuration to maintain the tape-roll guides 172 against rotation in the selected adjusted position and to limit upward movement of the feeding tape.

The operation of the dispensing machine 20 is clear from the foregoing detailed description and explanation taken with the drawings, but a summary is in order.

To ready the dispensing machine 20 for tape dispensing operation, the gummed tape roll 187 is inserted in the tape-roll chamber 180 after pivoting the plate 232 rearwardly. The tape-roll guides 172 are adjusted laterally to positions to centrally locate the tape roll 187 (Figs. 5 and 6). The tape is then led across the sleeve 174 and down the chute 166 beneath the guide 175 into contact with the wheel 145 and the roller 159, the plate 229 having been pivoted forwardly out of the way. The handle arm 61 is moved forward through a short arc to feed the tape just past the stationary knife 132, forward movement of the arm 61 effecting positive clockwise rotation of the wheel 145. This arc of forward movement of the arm 61 should be sufficient to clear the rocker member 140 with the toe 137 of the rocking member 136, so that, upon return movement of the arm 61, the rocker member 140 will pivot the rocking member 136 and member 124 which will move the knife elements 120 past the fixed knife blade 132 to sever the extending piece of tape so that subsequent segments may be properly metered. The tape moistening assembly 32 is filled with water to a suitable level and the brushes 195 and 196 permitted to pass an initial amount of water to the ends of the bristles.

The stops 102 and 103 are adjusted to the desired position for dispensing tape segments of predetermined lengths. In accomplishing the adjustment, it is but necessary to move the handle arm 61 forwardly until the indicator mark 209 on the head 228 of the arm 213 beneath the scale 227 is aligned with the inch number corresponding to the tape length desired, and then to move the stop 102 or 103 against the shoulder 92 of the rider 91 carried by the arm 61 and tighten the stop 102 or 103 in the position thus located. Similarly, the other stop is located to dispense a tape segment of a different length. The cover plates 229 and 232 are replaced, and the dispensing machine 20 is ready for operation.

In dispensing a tape segment, the operating arm 61 is moved forwardly to the first stop and released, whereupon it is returned to the starting position by the spring 218 (Fig. 8). During the initial forward movement of the operating arm 61, no tape is dispensed in view of the lost motion connection between the large gear wheel 111 and the shaft 60 to which the operating arm 61 is keyed. As soon as the lost motion is taken up, the large gear 111 is rotated, which rotates the pinion 148 and, therethrough, the shaft 146 to rotate the wheel 145, which feeds the tape forwardly between the body plate 203 of the presser member and the plate 206 into moistening engagement with the bristle ends of the brushes 195 and 196. As explained above, the rocker member 140 clears the toe 137 of the rocking member 136 during the initial movement of the operating arm 61, the knife elements 129 being maintained in raised inoperative position by the tension spring 128. The aforesaid clearing movement of the rocker member 140 may be said to cock the knife assembly 34.

Return movement of the operating arm 61 does not withdraw the tape in view of the overrunning clutch incorporated in the wheel 145. In the return movement of the operating arm 61 by the tension spring 218 or by hand, the rocker member 140 engages the toe 137 of the rocking member 136, which lowers the blade elements 129 in a severing action against the fixed blade 132 as is set out above. The shock of the return movement is sufficiently absorbed by the impact of the projection 214 against the liner 215 in the cup 216.

Should it be desired to clear the first stop 102 and to meter the tape by the stop 103, it is but necessary to raise the rider 91 to the position shown in Fig. 10 by pressing either the push button 71 or the push button 78, releasing the same prior to reaching the second stop 103 so that the rider 91 may contact it. Inasmuch as the shoulder 92 of the rider 91 is beveled at 93, it is not necessary to keep the button 71 or the button 78 depressed in returning the operating arm 61 past the first stop 102, for the beveled surface 93 permits the rider 91 to ride over the stop 102. The two push buttons 71 and 78 are provided in order to insure one-hand operation of the arm 61 when using either the right or the left hand. The rider 91 may be locked in an operative position through manipulation of the pin 98 in the inverted L-shaped slot 99.

It is clear from the foregoing that tape segments of predetermined lengths may be accurately and rapidly dispensed by the machine 20. It is further apparent that the means for dispensing tape segments of predetermined lengths may be rendered inoperative and tape segments of any desired length between a minimum of 3 inches and a maximum of 36 inches be metered by reference to the scale 227. The moistening and the severing of the tape are manifestly efficiently accomplished.

It is clear, therefore, that the objects and advantages sought for the present invention have been accomplished.

It is to be understood that the foregoing disclosure and the accompanying drawings are given by way of illustration and example. It is to be further understood that those modifications encompassing changes in the configuration of elements, rearrangement of parts and substitution of equivalents which will be apparent to those skilled in the art are contemplated as within the scope of the present invention, which is limited only by the claims which follow.

What is claimed is:

1. In a tape dispensing machine, in combination, a frame, a tape-roll support, means for feeding tape, a reciprocating lever of channel cross section having a forward feeding movement and an opposite return movement between feeding and return limits, one or more stop elements in the path of the lever intermediate said limits, a stop-engageable member movably mounted on the lever and cooperable with said intermediate stop element or elements, and means carried by the lever for rendering said stop-engageable member inoperative at the will of the operator including a bevelled head member disposed within the lever for reciprocation, a pair of plungers operatively associated with said bevelled head member for moving the same, a push button secured to each plunger and biased with its plunger towards rest position but adapted to be selectively pushed for rendering said stop-engageable member inoperative, whereby to feed different predetermined lengths of the tape material selectively.

2. In a tape dispensing machine, in combination, a supporting frame, a pivoted operating handle adapted to make forward and return strokes for dispensing a tape strip segment, a coil spring for effecting the return stroke of said handle, a pivoted lever offset from and adapted to move with said handle, said coil spring having one end connected to said lever and the other end connected to said frame, said spring being trained about a grooved pulley in the form of a U so that the spring ends are on the same side of said pulley and spaced therefrom, and means for compensating for lost tension effect in the spring as the pivoting lever is moved forward beyond its vertical radius including a member connected to said lever for movement therewith disposed between the sides of the U spring when said spring is at rest, said member supporting an element engageable with said spring to increase tension as the lever is rotated beyond its position of vertical radius.

3. In a tape dispensing machine, in combination, a supporting frame, a pivoted operating handle adapted to make forward and return strokes for dispensing a tape strip segment, a coil spring for effecting the return stroke of said handle, a pivoted lever offset from and adapted to move with said handle, said coil spring having one end connected to said lever and the other end connected to said frame, said spring being trained about a grooved pulley in the form of a U so that the spring ends are on the same side of said pulley and spaced therefrom, an extension secured to said lever and extending between the legs of the spring U when said lever is at rest, and a pulley pivotally mounted on said extension and disposed in the plane of the spring whereby said pulley contacts said spring as the lever is pivoted during forward pivotal movement of said handle to force said spring out of its normal channel to increase the tension effect.

4. In a tape dispensing machine, in combination, a frame, a tape-roll support, means for feeding tape, a reciprocating lever having a forward feeding movement and an opposite return movement between feeding and return limits operatively connected to said tape feeding means, one or more stop elements in the path of the lever intermediate said limits, a stop-engageable member movably mounted on the lever and cooperable with said intermediate stop element or elements, means carried by the lever for rendering said stop-engageable member inoperative at the will of the operator, and additional means carried by the lever for rendering and for maintaining said stop-engageable member inoperative including a member connected to said stop-engageable member for pivotal movement in relation thereto and for vertical movement therewith in relation to said lever, and an inverted L-slot in said lever, said member extending through said L-slot and being manually movable vertically and horizontally in said L-slot to dispose said stop-engageable member in retained inoperative position.

5. In a tape dispensing machine, in combination, a frame, means for feeding tape, a reciprocable lever mounted on said frame having a forward feeding movement and an opposite return movement between feeding and return limits, a stop engageable member reciprocably mounted on said lever, one or more stop elements mounted on said frame in the path of said stop engageable member intermediate the movement limits of said lever, manually movable means mounted on said lever connected to said stop engageable member for selective movement of the latter by the former, said manually movable means including a reciprocable composite member having a portion rotatable in relation to the other portions thereof, a member connected to said rotatable portion of said composite member for effecting rotation of said rotatable portion and reciprocable movement of said stop-engageable member independently of said manually reciprocable means, and means for maintaining said last-mentioned member in raised position with said stop-engageable member out of stop member engaging position.

6. The combination of claim 5 in which said means for maintaining said last-mentioned member in raised position comprises an inverted L-slot in said lever, said last-mentioned member extending through said inverted L-slot and being movable vertically in the vertical portion thereof and horizontally in the horizontal portion thereof, said horizontal portion thereof serving to maintain said last-mentioned member in raised position and said stop-engageable member in inoperative position.

7. In a tape dispensing machine, in combination, a frame, a tape-roll support, means for feeding tape, a reciprocating lever of channel cross section having a forward feeding movement and an opposite return movement between feeding and return limits, said lever including a transversely disposed hand grasp at its outer end, one or more stop elements in the path of the lever intermediate said limits, a stop-engageable member movably mounted on the lever and cooperable with said intermediate stop element or elements, and means carried by the lever for rendering said stop-engageable member inoperative at the will of the operator including a bevelled head member disposed within the lever for reciprocation, a pair of plungers operatively associated with said bevelled head member for moving the same, a push button secured to each plunger and biased with its plunger towards non-engaging relation with said stop-engageable member but adapted to be selectively pushed for rendering said stop-engageable member inoperative, said plungers and said buttons being disposed in said hand grasp.

8. In a tape dispensing machine, in combination, a frame, a tape roll-support, means for feeding tape, a reciprocating lever of channel cross section having a forward feeding movement and an opposite return movement between feeding and return limits, one or more stop elements in the path of the lever intermediate said limits, a reciprocable stop-engageable member mounted within the channel of the lever and cooperable with said intermediate stop element or elements, means carried by the lever for rendering said stop-engageable member inoperative at the will of the operator including an elongated member within said lever connected to said stop-engageable member for reciprocable movement therewith, said elongated member extending towards the free end of said lever, opposed push button means mounted at the free end of the lever for optionally actuating said member, and a member connected to each push button for movement therewith engageable with said elongated member upon actuation of its push button to actuate the same to move said stop engageable member to inoperative position, whereby to feed different predetermined lengths of the tape material selectively.

9. In a tape dispensing machine, in combination, a frame, a tape-roll support, means for feeding tape, a reciprocating lever having a forword feeding movement and an opposite return movement between feeding and return limits, one or more stop elements in the path of the lever intermediate said limits, a stop-engageable member movably mounted on the lever and cooperable with said intermediate stop element or elements, and means carried by the lever for rendering said stop-engageable member inoperative at the will of the operator including an elongated member mounted on said lever connected to said stop-engageable member for movement therewith, a pair of push buttons mounted in opposed relation at the free end of the lever, a member connected to each push-button individually engageable with said elongated member to move the same outwardly of the lever and the movable stop engageable member to inoperative position, and means biasing each push button and connected member to non-engaging relation with said elongated member, said push buttons providing means for optionally rendering said stop-engageable member inoperative through use of the left or right hand of a user, whereby to feed different predetermined lengths of the tape material selectively.

WALTON C. MARSH.

REFERENCES CITED

The following references are of record in the file of this patent:

UNITED STATES PATENTS

| Number | Name | Date |
|---|---|---|
| 1,887,460 | Nelson | Nov. 8, 1932 |
| 1,960,945 | Krueger | May 29, 1934 |
| 2,017,920 | Rost | Oct. 22, 1935 |
| 2,066,617 | Gautier | Jan. 5, 1937 |
| 2,066,619 | Gautier | Jan. 5, 1937 |
| 2,148,026 | Krueger | Feb. 21, 1939 |
| 2,293,433 | Gautier | Aug. 18, 1942 |
| 2,352,149 | Gautier | June 20, 1944 |
| 2,382,787 | Gautier et al. | Aug. 14, 1945 |